United States Patent Office 2,705,732
Patented Apr. 5, 1955

2,705,732

PRODUCTION OF VINYL CHLORIDE

Frédéric Francois Albert Braconier, Strivay, and Paulin Rayet, Liege, Belgium, assignors to Societe Belge de l'Azote et des Produits Chimiques du Marly, Liege, Belgium, a company of Belgium No Drawing. Application March 14, 1951, Serial No. 215,654

Claims priority, application Belgium July 17, 1950

5 Claims. (Cl. 260—656)

This invention relates to an improved process for the production of vinyl chloride.

Vinyl chloride can be produced by reaction in the gaseous phase, between acetylene and hydrochloric acid gas, the combination being catalytically effected by means of mercuric chloride with which a preferably porous support, such as activated carbon, is covered or impregnated and the hydrochloric acid being obtained by synthesis from hydrogen and chlorine. The drawback to the method hereinbefore defined is that the mercuric chloride catalyst deteriorates somewhat rapidly due to the deposition of carbon on its active surfaces, which deposition not only inhibits the catalytic activity but may also cause an excessive drop of pressure and even stoppages in the manufacturing plant.

This deposition of carbon is largely due to a reaction between the acetylene and the elementary chlorine which is frequently still present in the synthesized hydrochloric acid gas. Although only traces of free chlorine are accidentally present in the synthesized gas in normal operation, its detrimental influence on the catalyst is substantial and causes progressive contamination thereof.

Additionally, it may happen that as a result of a momentary stoppage of the generator producing the hydrochloric acid gas, the chlorine content of the reaction mixture inadvertently reaches, for a short time, high values which are much more prejudicial to the catalyst.

When chlorine is mixed with hydrochloric acid gas, in a proportion of up to 1 vol. per volume of hydrochloric acid gas, and then exposed to light, it reacts exothermically with acetylene forming chlorinated derivatives of the latter. On the other hand, even when chlorine is diluted to a concentration of from 2% to 5% in hydrochloric acid gas and shielded from the light it reacts with acetylene by substitution, with formation of carbon, which is the main cause of the contamination of the mercuric chloride catalyst. The latter condition, that is the absence of light, is that normally prevailing in industrial practice.

It is an object of the present invention to provide an improved process for the manufacture of vinyl chloride, by the reaction of acetylene and hydrochloric acid gas in the presence of mercuric chloride.

It is a further object of the present invention to reduce the deleterious effect of chlorine, which may be present in the initial reaction mixture, upon the mercuric chloride.

It is a particular object of the invention to subject the reaction mixture to a pre-treatment by passage over a nickel chloride catalyst.

It is proposed in the process of manufacture of vinyl chloride as hereinbefore defined to subject the reaction mixture to a preliminary treatment consisting in reacting the chlorine with acetylene, with formation of innocuous additive chlorinated derivatives, as in the reaction taking place under the influence of light, and thus to pass over the mercuric chloride catalyst only a mixture freed from elementary chlorine. This purification is possible due to the observation that, under the catalytic action of nickel chloride, the additive (non-substitution) reaction between chlorine and acetylene is industrially practicable even in the complete darkness prevailing in an installation constructed of opaque materials.

Preferably the reaction mixture is passed over the nickel chloride catalyst at a temperature between 110 and 160° C. and at a volumetric rate from 5 to 8 times higher than the volumetric rate at which it is passed over the mercuric chloride catalyst.

The normal process and manufacturing plant need only be modified or adapted to a very small extent, since it is sufficient to provide in front of the chamber containing the mercuric chloride catalyst, a similar catalysing chamber operating under similar conditions with nickel chloride.

The nickel chloride catalyst may be prepared by impregnating a porous support (terra cotta, pipe stems or the like) with a solution of nickel chloride and evaporating the excess water.

By way of example, 1 litre of pipe stems heated to about 110° C. is plunged in ¾ of a litre of a 12% $NiCl_2$ solution heated to about 100° C., the water in excess is slowly evaporated on a sand bath and the drying is completed in an oven at 120° C.

For gaseous mixtures containing between 0% and about 25% of elementary chlorine, it is advantageous to employ from 5 to 8 times more mercury catalyst than nickel catalyst.

The following example illustrates the invention.

Example

A gaseous mixture composed of 46.25% of $C_2H_2$, 51.25% of HCl, 2.5% of $H_2$ and traces of chlorine, was passed at a temperature of from 150° to 180° C., over a catalyst constituted by activated carbon impregnated with mercuric chloride at a rate of 100 litres per hour and per litre of catalyst.

In normal operation, that is to say without any accidental increase in chlorine concentration, the activity of the catalyst maintained itself at a rate of production of from 98% to 95% of vinyl chloride over a period of 300 hours.

A gaseous mixture having the same initial composition, but having previously been passed at 120° C. and at a rate of 800 litres of gas per hour and per litre of catalyst over a nickel chloride catalyst, was passed over the same mercuric chloride catalyst as that employed above and at the same temperature and rate. The vinyl chloride yield maintained itself at 99.5% over a period of more than 600 hours.

When in certain tests, owing to the accidental stoppage of the hydrochloric acid gas generator, the chlorine content of the gaseous mixture momentarily rose to 25% the nickel chloride catalyst was just as effective as for small chlorine contents and after the incident the vinyl chloride yield of the catalysis on mercuric chloride was not thereby affected.

We claim:

1. In a process for manufacturing vinyl chloride from actylene and hydrochloric acid gas, the steps of passing a reaction mixture containing acetylene, hydrochloric acid gas, and free chlorine accidentally present in the latter, over a nickel chloride catalyst to convert the free chlorine into an innocuous chlorinated acetylene derivative and subsequently forming vinyl chloride by passing the reaction mixture and the derivative over a mercuric chloride catalyst.

2. In a process for manufacturing vinyl chloride from acetylene and hydrochloric acid gas, the steps of passing at a predetermined volumetric rate a reaction mixture containing acetylene, hydrochloric acid gas, and free chlorine accidentally present in the latter, over a nickel chloride catalyst at a temperature between 110 and 160° C. to convert the free chlorine into an innocuous chlorinated acetylene derivative, and subsequently forming vinyl chloride by passing the reaction mixture and the derivative over a mercuric chloride catalyst, at a volumetric rate equal to one fifth to one eighth of said predetermined volumetric rate.

3. A process as claimed in claim 1, wherein the nickel chloride catalyst is carried upon a porous support.

4. In a process for manufacturing vinyl chloride from acetylene and hydrochloric acid gas, the steps of passing a reaction mixture containing acetylene, hydrochloric acid gas and up to 25% of free chlorine accidentally present in the latter over a nickel chloride catalyst to convert the free chlorine into an innocuous chlorinated acetylene derivative, and subsequently forming vinyl chloride by passing the reaction mixture and the derivative over five to eight times as much mercuric chloride catalyst as nickel chloride catalyst.

5. In a process for manufacturing vinyl chloride from acetylene and hydrochloric acid gas, the steps of passing a reaction mixture containing substantially 46% acetylene, 51% hydrochloric acid gas and 2½% free chlorine accidentally present in the latter over a nickel chloride catalyst to convert the free chlorine into an innocuous chlorinated acetylene derivative, at a temperature of substantially 120° C. and subsequently forming vinyl chloride by passing the reaction mixture and the derivative over a mercuric chloride catalyst at a temperature substantially within the range 150 to 180° C.

References Cited in the file of this patent

FOREIGN PATENTS

| | | |
|---|---|---|
| 573,594 | Great Britain | Nov. 28, 1945 |
| 576,099 | Great Britain | Mar. 19, 1946 |